March 31, 1964  C. J. SULLIVAN  3,126,649
EDUCATIONAL SCORING DEVICE
Filed March 8, 1962  3 Sheets-Sheet 1

INVENTOR.
Charles J. Sullivan,
BY
L. S. Saulsbury
ATTORNEY.

March 31, 1964  C. J. SULLIVAN  3,126,649
EDUCATIONAL SCORING DEVICE
Filed March 8, 1962  3 Sheets-Sheet 2
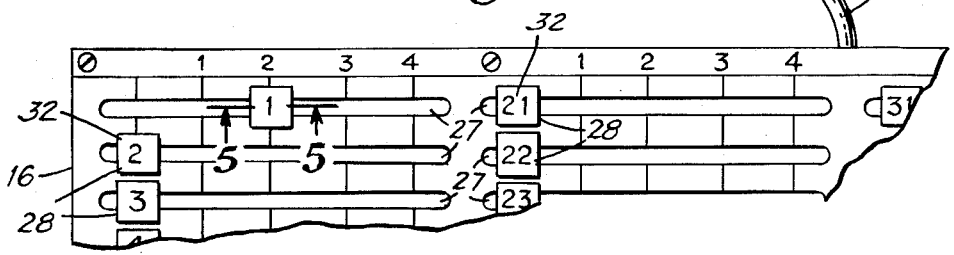
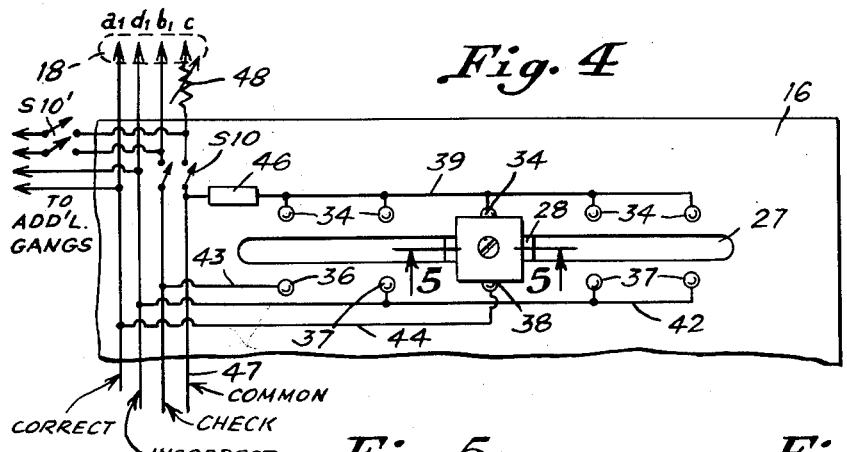
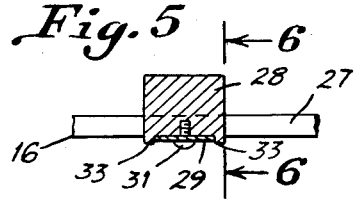
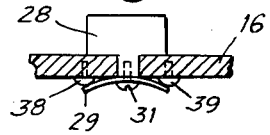
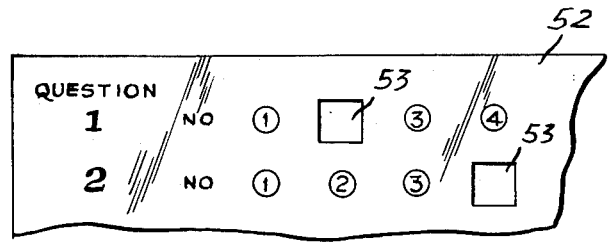
INVENTOR.
Charles J. Sullivan
BY L. S. Saulsbury
ATTORNEY.

United States Patent Office   3,126,649
Patented Mar. 31, 1964

3,126,649
EDUCATIONAL SCORING DEVICE
Charles J. Sullivan, 40 Albemarle Place, Yonkers, N.Y.
Filed Mar. 8, 1962, Ser. No. 178,426
5 Claims.  (Cl. 35—48)

This invention relates to an electrical device for registering and scoring the answers to multiple choice educational test questions, and represents an improvement on U.S. Patent No. 3,003,259 of October 10, 1961.

It is the principal object of the present invention to provide a multiple choice electrical answer register in which a large number of answers may be registered on a compact unitary answer board having slides which are correlated by designating characters to a separate question chart.

It is another object of the present invention to provide a multiple choice electrical answer register in which the positioning of each individual register in its no-answer position provides a means for calibrating each different register or test board with respect to a master calibrator and scorer.

It is still another object of the present invention to provide a scoring system for multiple choice question devices which affords means for regulating the scores in response to an instrument setting corresponding to either the age of examinee or to the number of questions.

It is a further object of the invention to provide a plurality of settable question boards, each of which has adjusting means to bring it into calibrated compatibility with other such boards.

It is a still further object of the invention to provide a circuit means to read negative scores and to protect the reading means for such negative scores.

It is a still further object to provide a pluggable means to adjust the score reading system to an arbitrary number of questions in addition to the predetermined calibrating means.

It is a still further object to provide an auxiliary matrix scoring means for scoring in the event of failure of the primary electrical scoring device.

Figure 1:
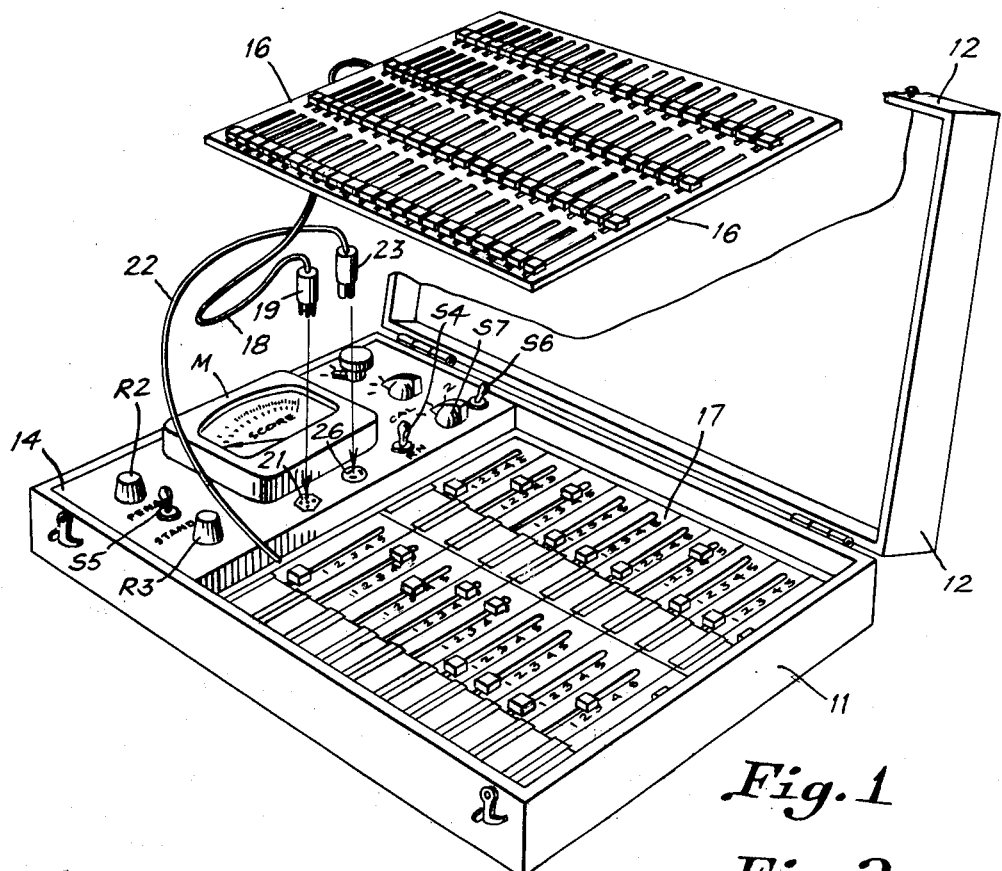
Figure 2:
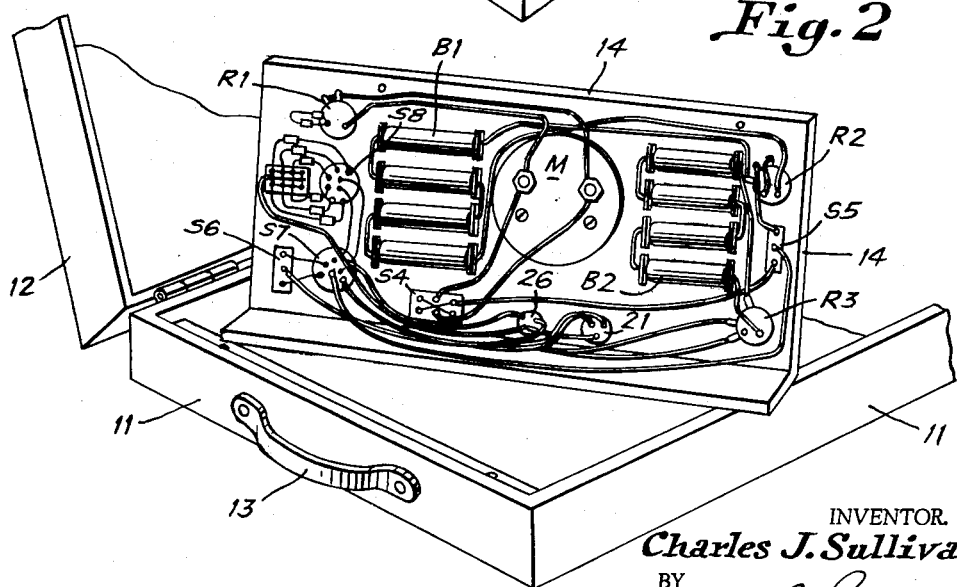
Figure 8:
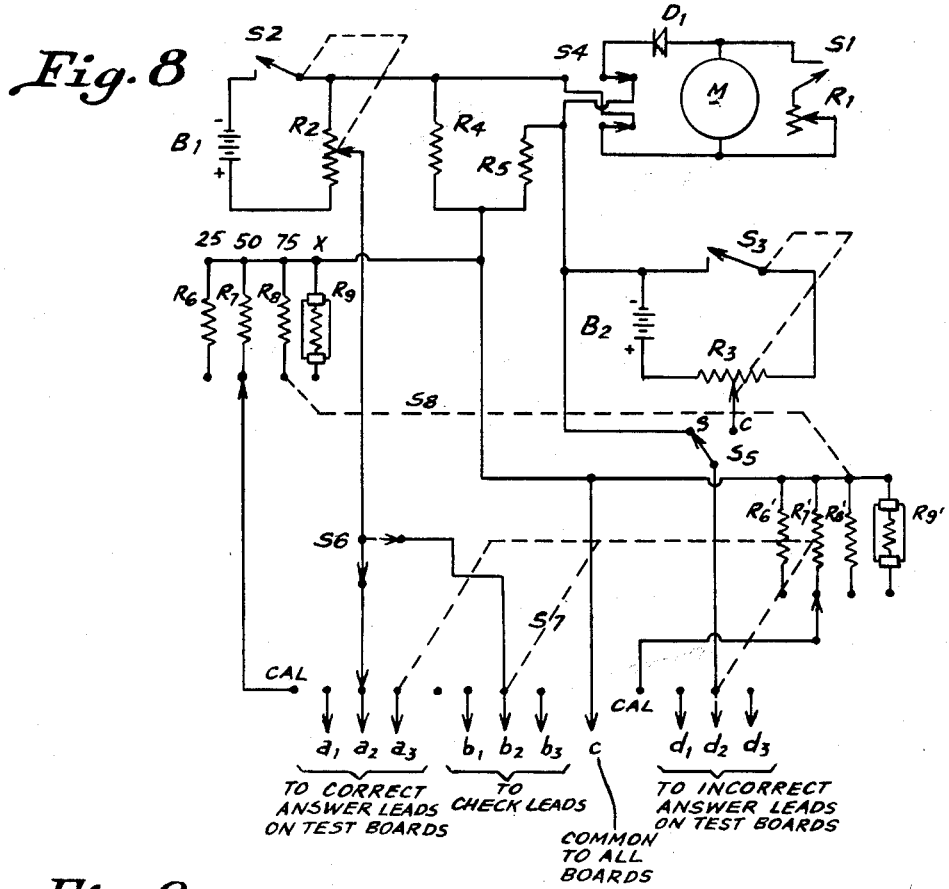
Figure 9:
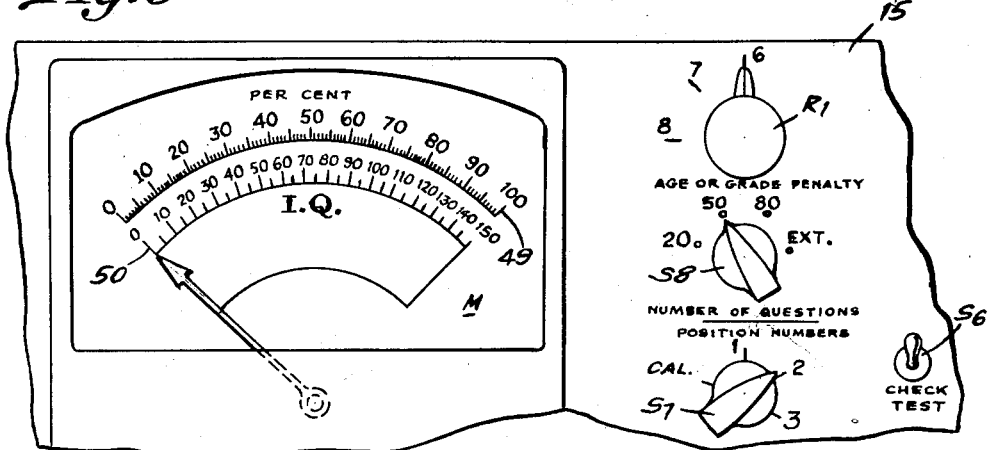

For other objects and a better understanding of the present invention, reference may be had to the following detailed description taken in connection with the accompanying drawings, in which FIGURE 1 is a perspective view of a demonstration model incorporating both the unitary register board of the present invention and the rearrangeable type of register board of the above cited patent, FIG. 2 is a fragmentary perspective view of the device shown in FIG. 1, showing the scoring circuit panel removed to reveal its rear construction, FIG. 3 is a front fragmentary view of the register board of this invention showing the numbered answer slides and the multiple answer index lines, FIG. 4 is a view of the reverse side of the board shown in FIG. 3, FIG. 5 is a sectional view of the reverse side of the board taken on line 5—5 of FIG. 4, FIG. 6 is a view taken on line 6—6 of FIG. 5, FIG. 7 is a face view of an auxiliary decoding card for scoring board scores by visual inspection, FIG. 8 is the schematic electrical wiring diagram of the circuit of the device of FIG. 1, and FIG. 9 is an enlarged fragmentary front view of the scoring panel of FIG. 1 showing the meter scales and some of the control knobs.

Referring to the drawings, a case 11 having a cover 12 and handle 13 is provided to house a scoring panel 14, a unitary register or test board 16, and a rearrangeable register or test board 17 which is identical to the assembly 24, 41, 35 of the drawings of U.S. Patent 3,003,259. The board 16 is connected to scoring panel 14 by a cable 18 and a plug 19 which engages a panel socket 21. Similarly, the board 17 is connected to panel 14 by a cable 22 and plug 23 which engages a panel socket 26.

The panel 16, FIGS. 3 to 6, is provided with an array of slots 27, each of which has an individually numbered slide block 28 slidably secured therein by a spring metal contact leaf which secures to block 28 by means of a screw 31. The numerals 32 on the tops of slide blocks 28 uniquely identify each answer slide. The two protuberances 33 from block 28 constrain leaf 29 to lie transversely to the slot bridging it from side to side.

A plurality of contact studs 34, 36, 37 and 38 are secured to the underside of board 16 in pairs capable of being mechanically and electrically bridged by the slidable contact leaf 29 so as to form a single pole five position switch. Contacts 34 are connected together by wire 39 to form a common pole to the switch register. Contacts 37 are connected together by wire 42 to form a connection to an incorrect answer bus $d1$. The check or "no-answer" contact 36 is connected by a wire 43 to the check bus $b1$. Similarly, the correct contact stud 38 is connected by a wire 44 to a correct answer bus $a1$. Each slide pole 39 is provided with a resistor 46 which is connected between each pole wire 39 and a common bus 47. For equalization between different boards 16 due to statistical differences in the tolerance of the values of resistors 46, a variable adjustment resistance 48 is provided for and secured to each board 16. Resistor 48 is connected between bus 47 and a common ground lead $c$. Thus, cable 18 from a first board 16 includes leads $a1$, $b1$, $c1$, and $d1$. The cable 18 from a second board 16 would include leads $a2$, $b2$, $c$, and $d2$, and so on for successive boards 16.

It thus may be seen from the connection system of FIG. 4 that a number of resistors 46 equal to the number of correct answers registered by slide blocks 28 will be electrically connected in parallel between leads 47 and $a1$. The resistance between the latter leads will therefore be inversely proportioned to the number of correct answers. Similarly, the resistance between leads 47 and $d1$ will be inversely proportional to the number of incorrect answers, N1.

When all the slides 28 are in the check or no-answer position, all the resistors 46 will be in parallel across leads 47 and $b1$ and in this condition can be used for checking and calibrating purposes. It is understood that the relative positions of contact studs 37 and 38 for each different slide 28 are chosen at random so that the student must make his choice on the basis of the corresponding question. It will also be understood that much of the wiring can be effected by printed wiring.

Sectionalizing switches S10, S10' and other such switches, not shown, may be used to disable any selected section of the test board if the total number of questions desired is less than the total number of questions that the test board can accommodate, or in other words, these switches are used when the use of only a part of the test board is desired.

Referring now to the schematic diagram of FIG. 8 taken in conjunction with the wiring shown in FIG. 4, a high resistance voltmeter M is connected through diode D1 and through polarity reversing switch 54 to the series connection of equal resistors R4 and R5, so that the voltage registered on M is a function of the algebraic sum of the voltage drops appearing across R4 and R5 whose junction is at the ground potential of common ground lead $c$.

A current source B1 is provided with a potentiometer

R2 and a series switch S2 coupled thereto so that when the knob of R2 is advanced from its lowest position, S2 closes and applies an adjustable potential between R4 and the pole of a selector swtch S6. The current in R4 and the voltage read by meter M will thus be a direct function of the potential selected by R2, and an inverse function of the resistance present between the pole of switch S6 and the common ground lead.

A multiple pole multiple position manual switch S7 is provided to select which of the boards 16, 17 or others are to be scored or whether the scoring circuit is to be connected to a calibrating circuit for adjusting the device to score correctly on meter M for different numbers of test questions.

When the switch S7 is positioned so that its three poles communicate with leads a1, b1, and d1, respectively, of cable 18 via socket 21 and plug 19, then, with S6 in the position shown in FIG. 8, the resistance between the pole of S6 ad ground c will be inversely proportional to the number of correct answers selected on the first board 16, and, consequently, the voltage read on meter M due to the drop across resistor R4 will be approximately proportional to the percentage of correct answers registered on their board. This measurement is the "simple" or "standard" mode of test scoring and it presumes that there is negligible current flowing in R5 in relation to the sensitivity of the voltage. This mode is selected by the single pole double throw switch S5 in its position shown in FIG. 8.

If, however, switch S5 is thrown to its opposite position the scoring system is in its "complex" or "penalty" mode in which currents can be passed through R5, in proportion to the number of incorrect answers chosen, in a direction to oppose the voltages generated in R4 by the number of correct answers. In this way the complex mode of switch S5 penalizes the students for wrong choices or incorrect guesses to an amount determined by B2 and R3 through S3.

For the penalty mode, current supply battery B2 is provided together with potentiometer R3 and coupled switch S3 so that when R3 is advanced from its lowest position S3 closes and allows a potential to be selected by R3 for impression between R5 and an incorrect bus lead d.

In the penalty mode, since the voltage drops in R4 and R5 due to B1 and B2 opposing one another, it is possible to get negative scores. In order to accommodate this condition the reversing switch S4 is provided, and the diode D1 is inserted in series with meter M to protect it from reverse readings.

Switch S6 is provided for checking purposes. When it is thrown to the opposite position to that shown in FIG. 8, it substitutes bus b for bus a thereby reading the parallel resistance of the no-answer position of the board slides. This test position is also useful in allowing the board to board compensation to be accomplished by the adjustment of each board's resistor 48 for uniform reading on meter M with all slides in their no-answer position.

With selector switch S7 in its "calibrate" position, the parallel total correct answer resistance of a board is replaced by one of the calibrating resisotrs R6, R7, R8 or R9. Similarly, the "calibrate" position of S7 also substitutes one of the calibrating resistors R6', R7', R8' or R9' respectively, depending on the selected position of double pole four throw switch S8, for the parallel total incorrect answer resistance of the same board.

The foregoing four pairs of resistors are chosen to represent the total resistance which would obtain for four different total numbers of questions. Consequently, adjustment of R2 and R3 with S7 in the calibrate position allows the meter M to be set to 100% for the given total number of questions. For example, with S7 on "calibrate," S5 on "standard," and S8 on 20, resistor R6 will be in the circuit and has a value equal to one twentieth of resistor 46. If R2 is now adjusted until meter M reads 100% the instrument is then calibrated for twenty question tests. Resistors R9 and R9' are made to be plug-in external resistors to accommodate odd or infrequently used total numbers of questions.

A feature of this instrument is the adjuestment afforded by variable resistor R1 which may be connected in shunt relation to meter M by the closure of switch S1. This allows the meter readings to be modulated in accordance with an age or grade penalty. In this way, the percentage readings on the meter scale 49, FIG. 9, can be converted to readings on an intelligence quotient scale 50 by the closure of shunting switch S1 with resistor R1 set at a value corresponding to the student's age or class.

In FIG. 7 a transparent visual auxiliary scoring chart 52 is shown, having apertures 53 located at the correct answer locations as determined by the location of contacts 38. This may be used for servicing or checking purposes, or for scoring register boards in the event of battery failure.

While various changes may be made in the detailed construction, it shall be understood that such changes shall be within the spirit and scope of the present invention as defined by the appended claims.

What is claimed is:

1. An educational scoring device comprising a register board, a plurality of multiple position register switches secured to said board, a resistor for each switch, a first, second, third and fourth terminal, each switch having a first position connecting a corresponding one of said resistors, in parallel relation to said first terminal and said second terminal, each switch having a second position connecting its resistor across said first and said third terminal, each switch having a third position connecting its resistor across said first and said fourth terminal, a voltmeter, a first load resistor, a second load resistor, first circuit means connecting said voltmeter with said first and second load resistors in series connection, a first adjustable source of potential, second circuit means connecting said first and second terminals, said first source of potential and said first load resistor being in series relations and third circuit means connecting said first and third terminals, said second source of potential and said second load resistor being in series relation, and switch means to alter said second circuit means to connect said first and fourth terminals with said first load resistor and said first potential source in series connections.

2. An educational scoring device according to claim 1 in which a diode is provided connected in series with said voltmeter, and in which switch means are provided to reverse the polarity relation between said voltmeter and said load resistors.

3. An educational scoring device according to claim 1, in which a variable shunt resistor, together with a shunting switch and a fourth circuit means, are provided to connect said voltmeter and said shunt resistor and said shunt switch in series relative to each other.

4. An educational scoring device according to claim 1, in which disabling switch means are provided to leave said second potential source out of series relation with said first and third terminals and said second load resistor.

5. An educational scoring device according to claim 1, in which common and check circuit means are provided including sectionalizing switches for disabling any desired part of the register board.

References Cited in the file of this patent

UNITED STATES PATENTS

| | | |
|---|---|---|
| 1,544,446 | Goodridge | June 30, 1925 |
| 2,060,308 | Harding | Nov. 10, 1936 |
| 2,228,331 | Warner | Jan. 14, 1941 |
| 3,003,259 | Sullivan | Oct. 10, 1961 |